(12) United States Patent
Kussmaul et al.

(10) Patent No.: US 8,108,395 B2
(45) Date of Patent: *Jan. 31, 2012

(54) AUTOMATIC ARRANGEMENT OF PORTLETS ON PORTAL PAGES ACCORDING TO SEMANTICAL AND FUNCTIONAL RELATIONSHIP

(75) Inventors: Timo Kussmaul, Boeblingen (DE); Andreas Arning, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/623,423

(22) Filed: Nov. 22, 2009

(65) Prior Publication Data

US 2010/0217777 A1 Aug. 26, 2010

Related U.S. Application Data

(63) Continuation of application No. 11/531,251, filed on Sep. 12, 2006, now Pat. No. 7,653,659.

(30) Foreign Application Priority Data

Dec. 12, 2005 (EP) .................................... 05111949

(51) Int. Cl.
*G06F 17/30* (2006.01)
*G06F 7/00* (2006.01)
(52) U.S. Cl. ..................... 707/737; 707/776; 707/794
(58) Field of Classification Search .................. None
See application file for complete search history.

(56) References Cited

U.S. PATENT DOCUMENTS

| 6,836,773 | B2* | 12/2004 | Tamayo et al. ................. 1/1 |
| 7,386,611 | B2* | 6/2008 | Dias et al. ................. 709/224 |
| 7,890,327 | B2* | 2/2011 | Dorai et al. ................. 704/256 |
| 2002/0129011 | A1* | 9/2002 | Julien ................. 707/3 |
| 2002/0152222 | A1* | 10/2002 | Holbrook ................. 707/104.1 |
| 2003/0033138 | A1* | 2/2003 | Bangalore et al. ............ 704/205 |

(Continued)

FOREIGN PATENT DOCUMENTS

JP 2005-092443 A1 4/2005

(Continued)

OTHER PUBLICATIONS

Pakhira, Malay K., Bandyopadhyay, Sanghamitra, Maulik, Ujjwal, Validity Index for Crisp and Fuzzy Clusters, Mar. 2004, Elsevier Science B.V., vol. 37, Issue 3, pp. 487-501.*

*Primary Examiner* — Greta Robinson
*Assistant Examiner* — James J Wilcox
(74) *Attorney, Agent, or Firm* — David A. Dagg (57) ABSTRACT

The present invention relates to the field of network computing, and in particular to method and system for designing a Web Portal comprising a hierarchical structure of portal pages and portlets for accessing Web contents accessible via the Portal. A typical larger enterprise's portal contains large numbers, e.g., thousands of pages and portlets. Due to the complexity of an enterprise portal, manual administration is inefficient as it is time-consuming, error-prone and thus expensive. In order to overcome these disadvantages, it is proposed that a Portal according to the invention performs some mining of the portlet markup and/or that of the portlet description in order to autonomously compute and propose an enhanced portal content structure. This helps to provide a user-friendly content structure that reflects well the relationships between portlets.

19 Claims, 11 Drawing Sheets

U.S. PATENT DOCUMENTS

| | | | |
|---|---|---|---|
| 2003/0110181 A1* | 6/2003 | Schuetze et al. | 707/103 R |
| 2003/0145014 A1* | 7/2003 | Minch | 707/100 |
| 2003/0237094 A1* | 12/2003 | Kurapati et al. | 725/46 |
| 2004/0117226 A1* | 6/2004 | Laiho et al. | 705/7 |
| 2004/0199584 A1* | 10/2004 | Kirshenbaum et al. | 709/205 |
| 2005/0137939 A1* | 6/2005 | Calabria et al. | 705/26 |
| 2007/0094595 A1* | 4/2007 | Heck et al. | 715/700 |

FOREIGN PATENT DOCUMENTS

| | | |
|---|---|---|
| JP | 2005-149065 A1 | 6/2005 |
| JP | 2005-316897 A1 | 11/2005 |

* cited by examiner

PRIOR ART
PORTAL SERVER

| TRAIN SCHEDULE 211 | TRAIN TICKETS 212 | RENTAL CARS 213 | TRIP PLANNING 214 | FLIGHT BOOKING 215 | News 216 | TELEPHONE BOOK 217 |
|---|---|---|---|---|---|---|
| Keyword: TRIP SCHEDULE TIME | Keyword: TRIP TRAIN TICKETS COSTS | Keyword: TRIP RENTAL CAR COSTS | Keyword: TRIP TRIP PLANNING TIME | Keyword: TRIP (FLIGHT-BOOKING-TIME) COSTS | Keyword: News | Keyword: TELEPHONE BOOK |
| SIZE 50% of Screen | SIZE 40% of Screen | SIZE 30% of Screen | SIZE 30% of Screen | SIZE 30% of Screen | SIZE 30% of Screen | SIZE 30% of Screen |

AUTOMATIC ARRANGEMENT OF PORTLETS ON PORTAL PAGES ACCORDING TO SEMANTICAL AND FUNCTIONAL RELATIONSHIP

CROSS REFERENCE TO RELATED APPLICATIONS

The present application is a Continuation under 35 U.S.C. 120 of commonly assigned prior U.S. application Ser. No. 11/531,251, filed Sep. 12, 2006 in the names of Timo Kussmaul and Andreas Aming, now U.S. Pat. No. 7,653,659 B2, and accordingly also claims priority under 35 USC 119 to European Patent Application Number EP05111949.3, filed Dec. 12, 2005.

FIELD OF THE INVENTION

The present invention relates to the field of network computing, and in particular to a method and system for designing a Web Portal or Enterprise Portal including a hierarchical structure of portal pages and portlets for accessing Web contents or Enterprise contents accessible via the Portal.

BACKGROUND OF THE INVENTION

Figure 1:
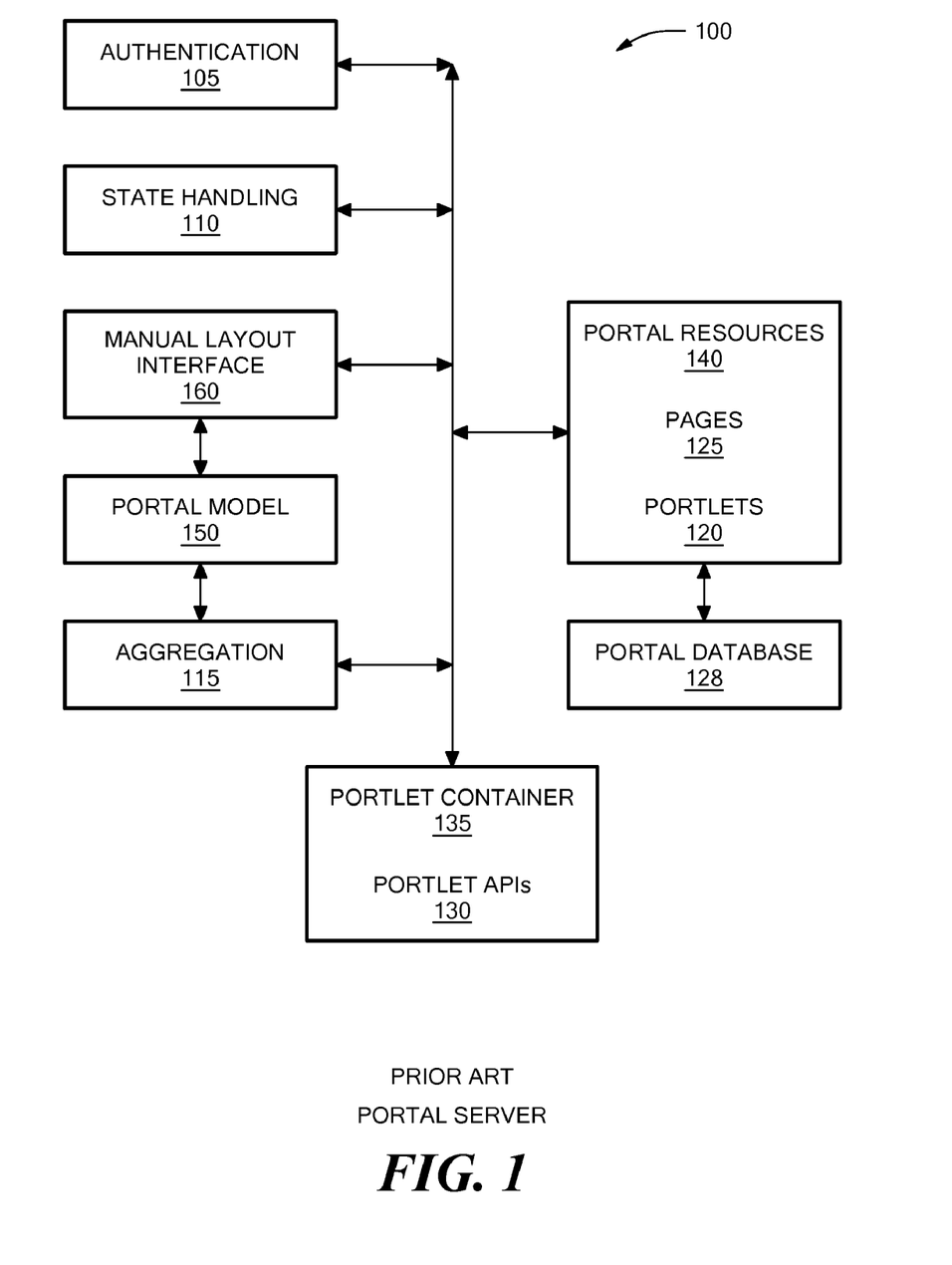
FIG. 1 is a schematic diagram illustrating the structural components of a prior art portal server including lines of interactions.

FIG. 1 gives a schematic system view of a Portal server implementing such a prior art Web Portal. A prior art Portal, such as e.g., IBM WebSphere Portal or Jetspeed2 Enterprise Portal (www.Portals.apache.org/jetspeed-2/Portal-design.html), is built by a complex functionality implemented on a network server—for example a Web server 100, the most important elements of which are logic components for user authentication 105, state handling 110, aggregation 115 of fragments, a plurality of Portlets 120—further described below—provided in respective pages 125 with a respective plurality of APIs 130 to a respective Portlet container software 135 for setting them into the common Web page context, and some Portal storage resources 140. The logic components are operatively connected such that data can be exchanged between single components as required. This is roughly depicted in FIG. 1.

In more detail, a Portal engine of the Web server in FIG. 1 implements an aggregation of Portlets 120 based on the underlying Portal model 150 and Portal information such as security settings, user roles, customization settings, and device capabilities. Within the rendered page, the Portal automatically generates the appropriate set of navigation elements based on the Portal model. The Portal engine invokes Portlets during the aggregation as required and when required and uses caching to reduce the number of requests made to Portlets. The prior art IBM WebSphere Portal employs open standards such as the Java Portlet API (application programming interface). It also supports the use of a remote Portlet via the WSRP standard.

The Portlet container 135 is a single control component competent for all Portlets 120, which may control the execution of code residing in each of these Portlets. It provides the runtime environment for the Portlets and facilities for event handling, inter-Portlet messaging, and access to Portlet instance and configuration data, among others. The Portal resources 140 are in particular the Portlets 120 themselves and the pages 125, on which they are aggregated in form of an aggregation of fragments. A Portal database 128 stores the portlet description, this is in detail the portlet description featuring some attributes like portlet name, portlet description, portlet title, portlet short title, and keywords; the portlet interaction interface description, which is often stored in form of WSDL documents. The Portal database also stores the Portal content structure, i.e. the hierarchical structure of portal pages—which may again contain nested pages—and portlets. This data is stored in the database 128 in an adequate representation based on prior art techniques like relational tables.

The before-mentioned aggregation logic 115 includes all steps that are required to assemble a page. Typically, these steps are to load a content structure from storage, to traverse it and to call the instances referenced in the structure in order to obtain their output, which is assembled to a single page. The content structure may be defined through e.g. Portlet Customization by the administrators or users and saved in the database, or by other ways, e.g. scripting, xml import, etc.

A graphical user interface component 160 is provided for manually controlling the layout of the plurality of rendered pages. By that interface 160 a Portal administrator is enabled to control the visual appearance of the Web pages. In particular, the Administrator can decide which Portal is rendered at which location next to which other Portlet at a given Web page.

Figure 2:
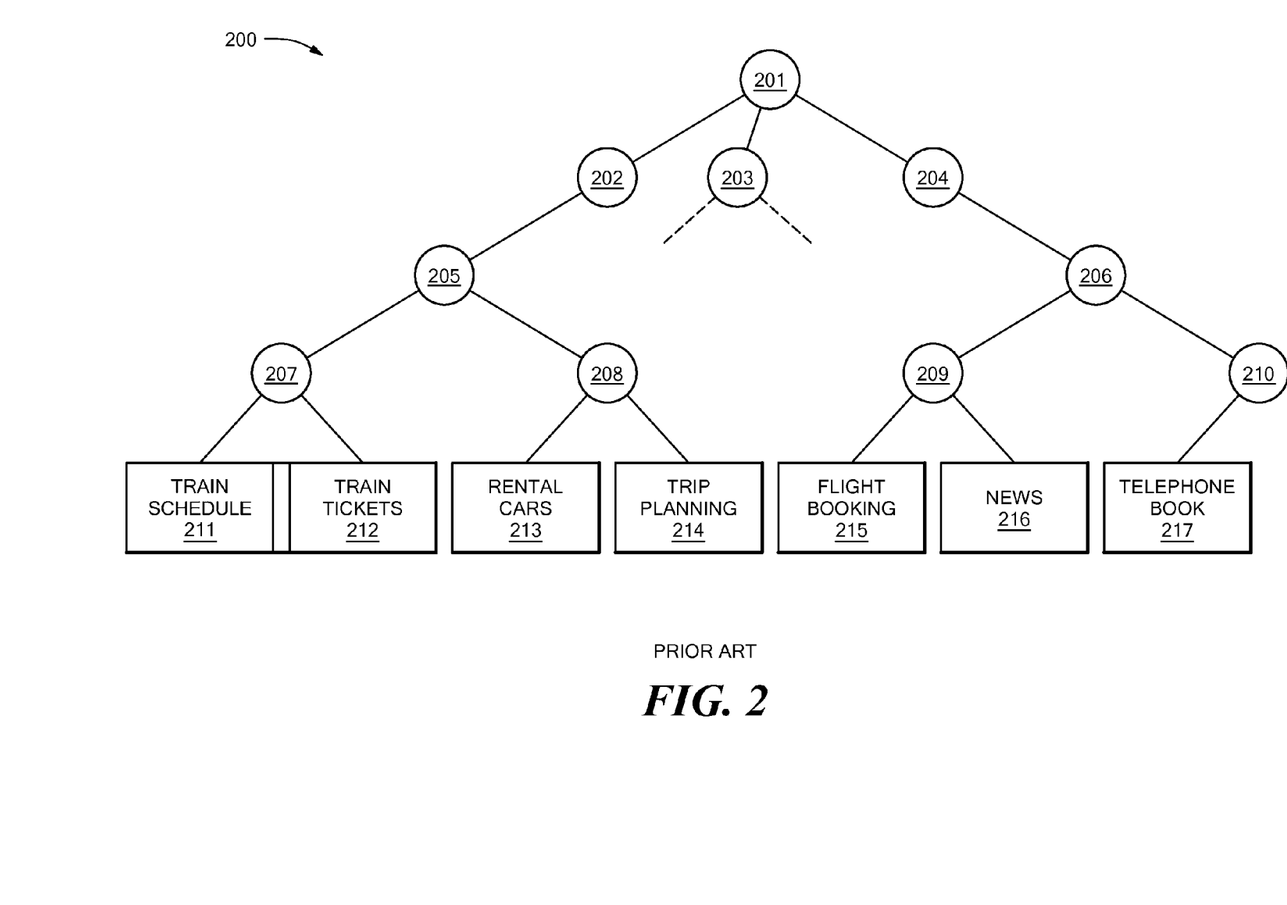
FIG. 2 is a schematic, exemplary portal structure including pages (the circles) and portlets (the rectangles) arranged in a hierarchical tree structure.

With particular reference to the focus of the present invention the structure behind a Portal is illustrated by way of a tourist information Portal example in FIG. 2. Such prior art portal is made up of a hierarchical structure 200 of portal pages, see the circles 201 to 210—which may again contain nested pages, see 201 to 206—and portlets 211 to 217.

Such structure is generally referred to herein as "content structure". Of course, the Portlets 211 to 217 are not restricted to be located at one and the same hierarchy level (as depicted in FIG. 2); instead they can be distributed over any level.

Figure 3:
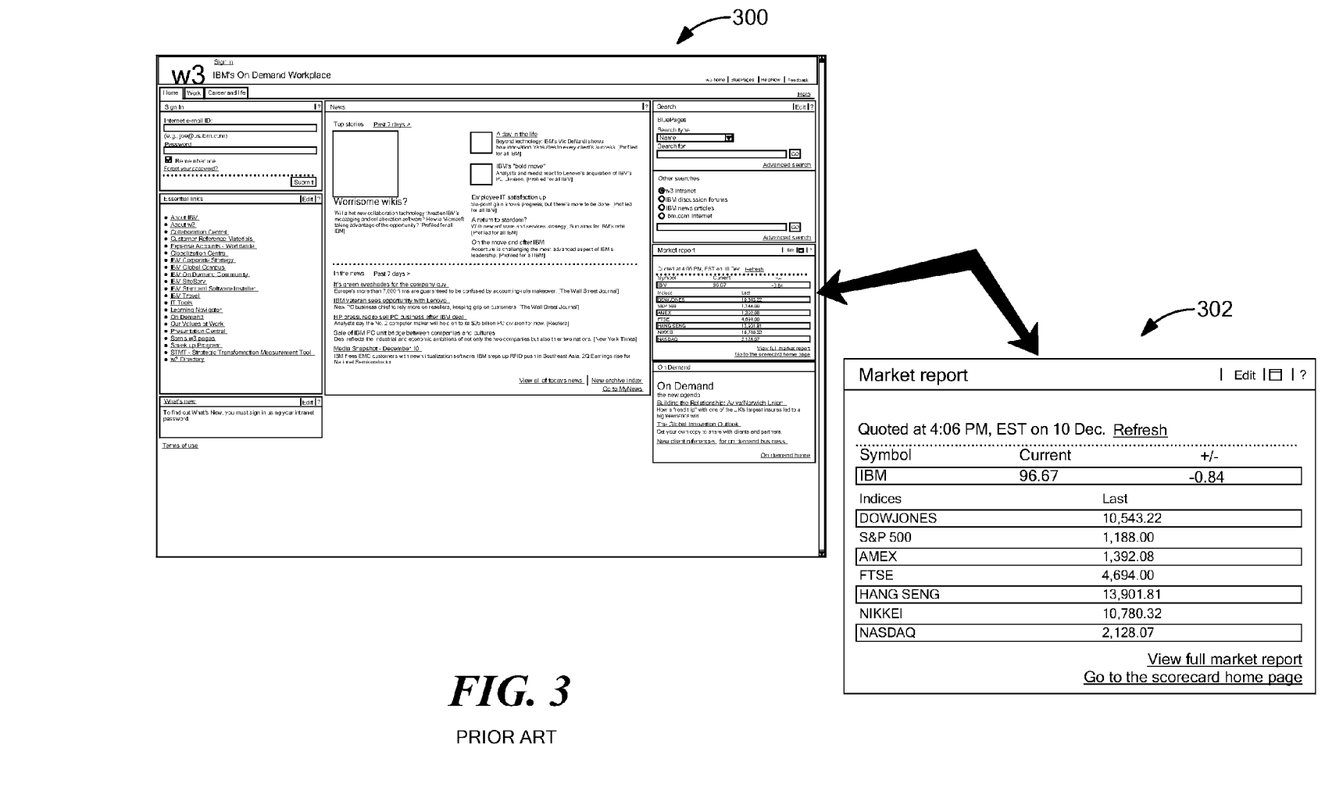
FIG. 3 left side is a view of a prior art sample portal illustrating one page thereof 300 (left side) and a zoom view 302 onto a portlet within the depicted page (right side)

With reference to FIGS. 2 and 3, in more detail, page 201 is the homepage of the portal. The homepage 201 comprises amongst other graphical elements three links leading to pages 202, 203, and 204. Page 202 comprises again another link which leads to page 205 which intern comprises links leading to pages 207 and 208. A similar structure is repeated for page 204 leading to pages 206, 209 and 210. A similar structure could be appended beneath page 203, which is suppressed here in order to increase clarity of the drawing.

In this example page 207 comprises two portlets 211, 212. Portlet 211 shows the train schedule and portlet 212 is a portlet which guides the user when he wants to buy an online ticket. Under page 208 a portlet 213 related to rental cars is provided. Further under page 208, a trip planning portlet 214 is provided. Further, under page 209 a flight booking portlet 215 and a news portlet 216 is provided. Finally under page 206 a further page 210 comprising a telephone book portlet 217 is provided.

In prior art, the portal content structure as exemplarily depicted in FIG. 2 in a simplified manner is manually defined by portal administrators and users, using above interface 160 in FIG. 1. An administrator edits page 207 containing the "TRAIN SCHEDULE" portlet 211. In prior art there is generally no system support for configuring the content structure.

Although the content structure given in FIG. 2 is kept deliberately simple, a person skilled in the art will appreciate that the task of configuring the Portlets on the Web pages of a Portal is no more trivial, when the number of Portlets and the depth of the tree increases.

A typical larger enterprise's portal, however, contains large numbers, e.g., thousands of pages and portlets. Due to the complexity of an enterprise portal, manual administration is inefficient as it is time-consuming, error-prone and thus expensive. In addition, in a complex portal it is not possible for a human administrator to capture the entire set of functional and semantic relationships between portlets; thus an Administrator will very often not be able to arrange all portlets properly, such that a user visiting the Portal may easily find all those Portlets which are closely related to each other.

An improper arrangement of portlets including complex arrangements of inter-related Portlets when they are for example spread across different pages, results in a complex content structure and in difficult navigation. This may degrade the usability of the Portal and a user's productivity, as the user has to perform too many switches between pages in order to work with two or more functionally-related portlets. Further, a user risks to finish his visit on the portal uncompleted, for example due to the fact that the user is not aware of some relevant Portlet waiting for him to be called two pages higher in the tree.

Thus, it is basically foreseeable that additional helpdesk support and user training is required or at least recommended in such complex navigation structure.

SUMMARY OF THE INVENTION

It is an objective of the present invention to provide an improved method and system for designing a Web Portal including a hierarchical structure of portal pages and portlets for accessing Web contents accessible via the Portal. This objective of the invention is achieved by the features stated in enclosed independent claims. Further advantageous arrangements and embodiments of the invention are set forth in the respective subclaims. Reference should now be made to the appended claims.

Briefly, a Portal according to the invention performs some mining of the portlet markup and/or the portlet description in order to autonomously compute and propose an enhanced portal content structure. This helps to provide a user-friendly content structure that reflects well the relationships between portlets. This includes arranging inter-related portlets near by, preferably on one and the same page, and thus better integrates the portlets. This enhances user experience and productivity as it reduces the number of navigational actions—in particular page changes, and as it presents a more integrated view of related portlets.

The mining reveals semantic and functional similarities between the portlets. The result of the mining function is a more or less compressed form of grouped Portlets. A group is characterized by the feature that the Portlets comprised thereof have inter-relations between. The degree of closeness of interrelation may be preset by one or more initialization parameters. Those groups can be taken now and manually improved and further edited in order to better organize the pre-existing content structure.

According to the broadest aspect of the invention at the Portal Server a method for arranging Portlets in a Web Portal is disclosed, comprising a hierarchical structure of portal pages and portlets, which is characterized by the steps of:
a) retrieving data mining input data relating to said Portlets from the Portlet markup and/or from the Portlet description and/or from the Portlet interaction description of Portlets residing on the Portal, preferably from a database associated with the Portal or from a request to said Portlets,
b) performing a data mining function on said data mining input data, resulting in a data mining result revealing respective semantic and/or respective functional similarities between said portlets,
c) calculating a new content structure from said data mining result, wherein said new content structure arranges semantically and functionally similar Portlets on said pages, and
d) offering new pages with said new content structure.

Further advantageously, the portlet arrangement software may implement the step of receiving an administrator feedback, if the calculated arrangement of Portlets is accepted as a base version for a new Web Portal version.

Further, the mining may include performing a clustering of related Portlets.

Further advantageously, the portlet arrangement software may implement the step of receiving an administrator feedback including manually performed corrections on the offered web page structure.

Further, the step of calculating a new Portlet arrangement may be based on iterations and start with an existing Portlet arrangement.

Further, the step of calculating a new Portlet arrangement is performed when a new Portlet is to be installed on a page.

The following advantages and others can be obtained through the disclosed system:

First, a portal user benefits from enhanced integration of portlets and simplified navigation. Second, the portal administrator is relieved from manual configuration of the content structure.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

With general reference to the figures and with special reference now to FIGS. 4 and 5 a preferred embodiment of the present invention will be described in more detail below.

Figure 4:
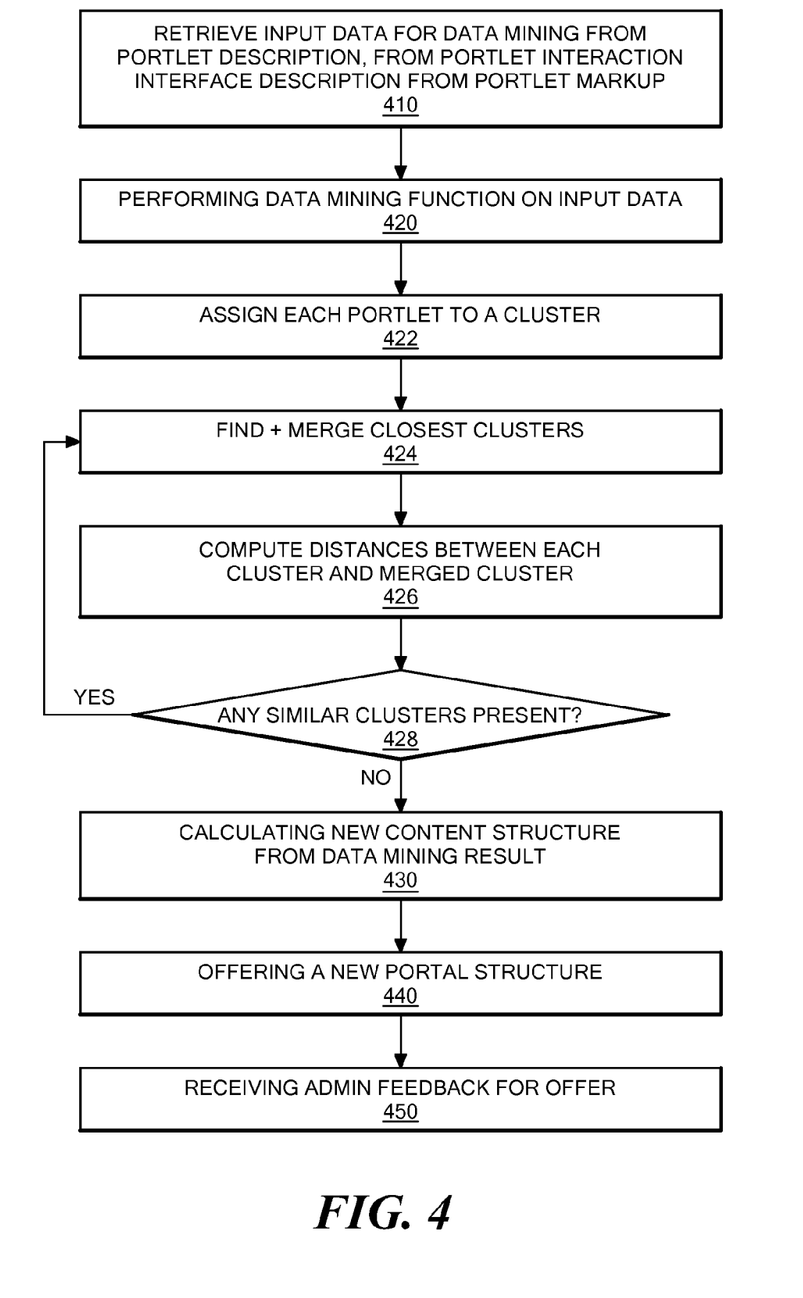
FIG. 4 is a schematic representation of the control flow of the disclosed method according to a specific embodiment thereof illustrating functional components implemented therein.
Figure 5:
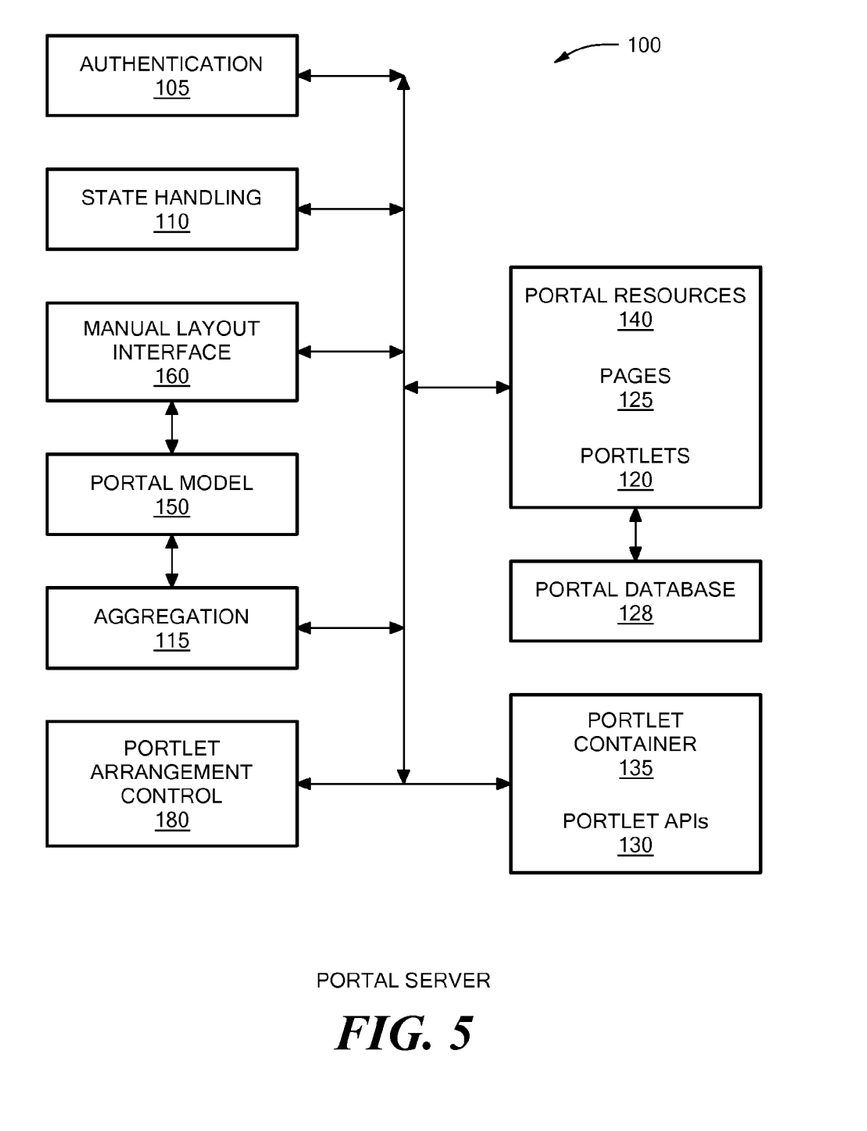
FIG. 5 is a schematic block diagram representation of a portal server according to a specific embodiment of the invention illustrating structural components implemented therein.

FIG. 5 differs from FIG. 1 basically in that there is a control block 180 provided to implement the disclosed functionality of semi-automated arrangement of Portlets. More particularly, this logic comprises all relevant interfaces in order to access the portal database 128, the portals 120 as far as needed and to connect to the user interface 160. This logic 180 implements the following disclosed method, illustrated by way of FIG. 4 and described next below:

In a first preparative block of steps which are depicted as block 410 in FIG. 4 the data mining input data is retrieved. A preferred data sources is the portal database 128. Preferably, the following input data is collected: the portlet description featuring some attributes like portlet name, portlet description, portlet title, portlet short title, and keywords; the portlet interaction interface description, which is often stored in form of WSDL documents, or the portlet markup e.g. HTML fragments, optionally HTML and JSP source files.

A further data source is the portlet itself: the data can thus be requested also from the portlets, for example when the before-mentioned Portlet arrangement control 180 requests markup from the portlet by invoking the portlet through the portlet container.

In the end of step 410 all relevant input data for the subsequent data mining step 420 are present.

In block 420 the data mining is done based on abovementioned input data collected in step 410. For this block 420, basic prior art data mining technology can be applied. This data mining function includes a prior art clustering algorithm which is applied to the present data, and that returns a hierarchy of clusters of related portlets. In a subsequent step 430, the cluster hierarchy is mapped to the content structure.

Briefly, the clustering returns a set of clusters, i.e. the set of all clusters is a function of all portlets. As a person skilled in the art knows, Clustering is the process of grouping a set of objects into classes of similar objects. Central to clustering is to determine the degree of similarity (or dissimilarity) between individual objects and between clusters, which is expressed as a distance value.

The preferred algorithm of the invention uses agglomerative hierarchical clustering techniques which iteratively join together similar clusters. This is depicted in steps 422 to 428 in FIG. 4 and will be described in more detail next below:

Step 422: The disclosed algorithm starts by assigning each portlet to a cluster, so that if there is a number of N (N can be any realistic number, 200, 500, 1000, etc., for example) portlets, initially there are N clusters, each containing just one portlet. For each pair of clusters, the distance (described later below in more detail) between the cluster pair is the same as the distance between the portlets they contain.

Step 424: here, the closest (most similar) pair of clusters is determined. Then, they are merged into a single cluster, so that now there remains a reduced number (N−1) of clusters.

Step 426: Then the distances between the new cluster and each of the old clusters is computed.

Then a loop condition 428 "Do the distance values exceed a pre-defined distance threshold T?" is executed and steps 424 and 426 are repeated until the distance values exceed this pre-defined distance threshold T, i.e. the loop is continued and the cluster gets merged in order to contain more and more Portlets as group members, until there are no more similar clusters—according to the user-defined distance T—which could be merged in a further iteration of step 424. The value T is chosen by the user, thereby allowing the user to specify at what similarity of two clusters no merging between these two clusters should be done.

Note that for didactical reasons, the check to terminate the loop is done at the end of the loop (after at least one iteration); preferably, in real applications, this test should be done in the beginning of the loop, allowing zero iterations as well (i.e. allow the case, where no merging happens at all).

The end result of the mining function is thus in general a reduced number of clusters, wherein each cluster comprises a certain plurality of inter-related Portlets.

Then, a new content structure is calculated in step 430 from the mining result. With reference to the illustration of FIG. 2, the tree structure given in FIG. 2 is redrafted. Based on this tree redraft a new Portal structure is calculated wherein an additional step is performed of arranging the most top-interrelated Portlets on a single page. This new tree structure coupled to a new, rough page layout is then displayed to the Administration User in a step 440 and proposed as a basic offer how the Portal pages could function better.

Further, optionally the Administrator may perform some personal re-redraft by the interface 160 in FIG. 1 and may trigger the disclosed program to redraft according to these new priorities. By that a feedback is fed also to the disclosed program, in step 450.

In the following, the distance calculation applied in the present invention is described in more detail as follows:

The distance d(A, B) between two portlets A, B is based on the distance between the portlet attributes, i.e., the portlet descriptions and portlet markups of the portlets A and B. Prior art text processing and text mining methods are used to compute the distance between attribute pairs as for example the so-called "TF-IDF Weighting" and Cosine Similarity Measure, see for example in Ricardo A. Baeza-Yates, Berthier Ribeiro-Neto, Modern Information Retrieval, Addison-Wesley Longman Publishing Co., Inc., Boston, Mass., 1999. The frequency of occurrence of a search term (TF) is discussed there in relation to term-specific relevance, which is measured as inverse document frequency IDF of a term. Applied to the present invention, the before-mentioned attributes are usable as such terms. The documents mentioned in this publication correspond to the totality of data sources relevant for the data mining used herein, and mentioned already above.

On the basis of portlet distance, an inter-cluster distance is defined. The distance D(X, Y) between two clusters X, Y is computed by aggregating the distance values of pairs of portlets in X and Y, for example in a complete linkage method, wherein the aggregation is performed by calculating the maximum of all distances between pairs of portlets in two clusters:

$$D(X,Y)=\max \{d(A,B) \text{ where portlet } A \text{ is in cluster } X \text{ and portlet } B \text{ is in cluster } Y\}$$

If a cluster contains more than one Portlet, then a respective number of calculations is done.

Alternatively, an average distance can be calculated. Then, the aggregation is performed by calculating the average of all distances between pairs of portlets in two clusters):

$$D(X,Y)=\text{avg} \{d(A,B) \text{ where portlet } A \text{ is in cluster } X \text{ and portlet } B \text{ is in cluster } Y\}$$

In addition, the disclosed cluster distance value calculation preferably incorporates heuristics to prevent oversized clusters, which would result in oversized pages. An example is to limit the number of Portlets on a single page to a predefined maximum number, e.g., 6, or 8.

Furthermore, the cluster distance calculation used in the above algorithm can be modified in order to increase the inter-cluster distance, if a check indicates that a union of two clusters would be oversized. The check is based on the definition of two parameters:

The parameter threshold1 limits the number of portlets in one cluster.

The parameter threshold2 limits the size of the page that corresponds to the cluster. Note that a page is aggregated from markup of the portlets contained in a given cluster.

A modified distance D calculation algorithm can thus be described as follows; pseudocode is added in brackets where useful:

First, the distance D between two Portlets, one in cluster X, the other in cluster Y is determined according to:

$D$=aggregation $\{d(A,B)$ where portlet $A$ is in cluster $X$ and portlet $B$ is in cluster $Y\}$;

Then, the portlets are determined which are assigned to cluster X∪Y (the union of X and Y).

Then, a check is performed: if the number of Portlets is larger than a pre-defined threshold (#portlets>threshold1), then the computed distance D is increased by a predefined increment;

($D=D$+increment; Return $D$)

Then the portlet preview markup of portlets in X∪Y is retrieved;

Then an aggregation of the portlet preview markup is performed, which results in a page preview;

Then, another check is performed: if the required size of the page is too large to display the markup of all Portlets, i.e., larger than a predefined threshold2, then the computed distance D is incremented, as for example:

(if size(page preview)>threshold2 $D=D$+increment; Return $D$)

A person skilled in the art will be able to determine further variations.

In order to completely prevent oversized pages, the parameter "increment" is set at least to the predefined threshold T.

The step 430 of calculating a new content structure from the clustering may be implemented as follows:

First, the cluster hierarchy is mapped to the page hierarchy, thus a bijective mapping between a page and one respective cluster is done. Thus a page-ID corresponds to a cluster-ID. This allows mapping each portlet to a page.

The result of step 430 is a new content structure model, thus, a modified FIG. 2 representation can be obtained.

Finally, the portal content structure is modified according to the resulting content structure model. This is realized by converting the content structure into a representation suited for being stored in a database (e.g. relational tables) and writing this representation to the Portal database. Subsequent Portal requests will be processed on basis of this new content structure.

This may include creating new pages, removing obsolete pages, and assigning the portlets to the pages.

Next, an example of the automatic arrangement of Portlets is given with reference to FIGS. 6 to 11, wherein only portlet title and portlet keywords are used as data mining input.

Further, a highly simplified distance calculation is used in order to increase clarity:
If portlet A and B have at least two common keywords
then the distance d is equal to 1: $d(A,B)=1$
Else, If A and B have at least one common keyword
then d is equal to 3: $d(A,B)=3$
else
d is equal to 5: $d(A,B)=5$
From FIG. 6 reveals:
d(Train Schedule, Trip Planning)=1, as the common keywords are: "Trip", "Time")
d(Train Schedule, Train Tickets)=3 (common keyword: "Trip")
d(Train Schedule, Telephone Book)=5 (no common keyword)

The above-mentioned complete linkage distance calculation yields:

$D(X,Y)$=max $\{d(A,B)$ where portlet $A$ is in cluster $X$ and portlet $B$ is in cluster $Y\}$.

For each portlet the disclosed program component indicates the size of the portlet window as percentage of a page (i.e. screen size). Thus, e.g. portlet Train Schedule requires 50% of the page, leaving 50% for other portlets on the same page.

In order to prevent oversized pages, the increment is set to:

increment=max($D$)+1=6, i.e. higher than every portlet distance value.

Figure 6:
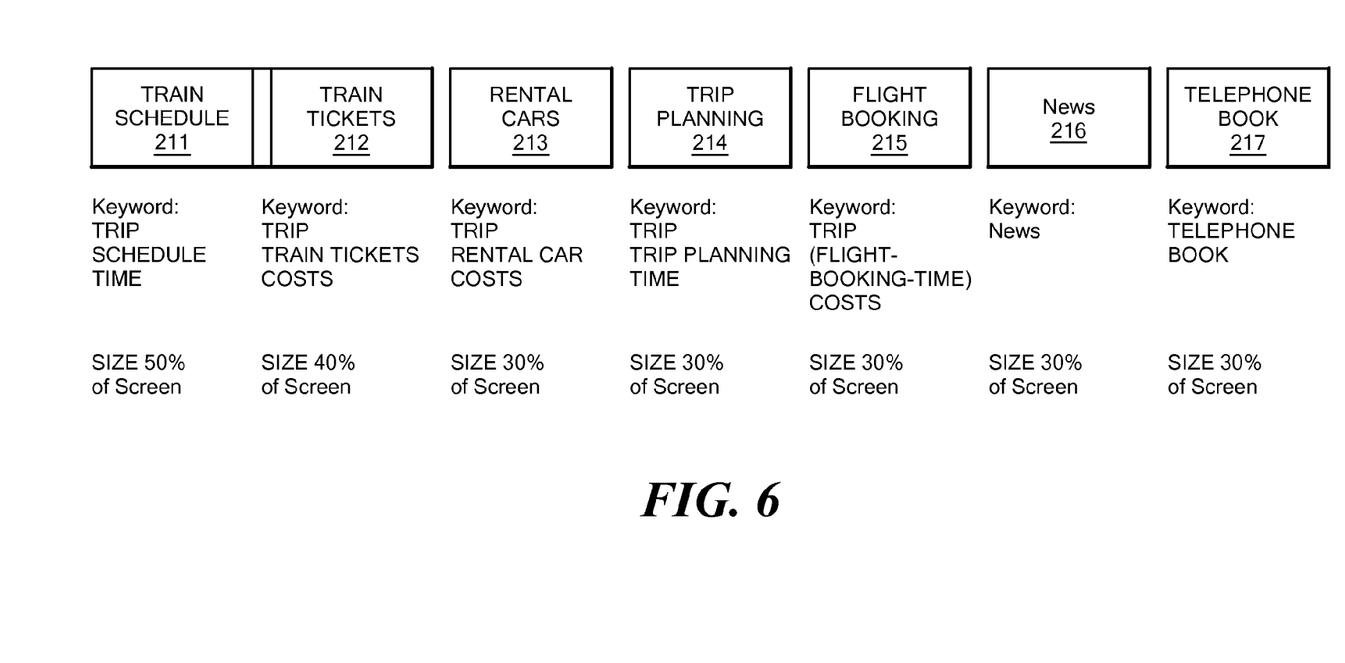
FIGS. 6 to 11 show cluster structures in respective different, subsequent stages during performing the clustering of portlets within the mining function performed in the disclosed method.
Figure 7:
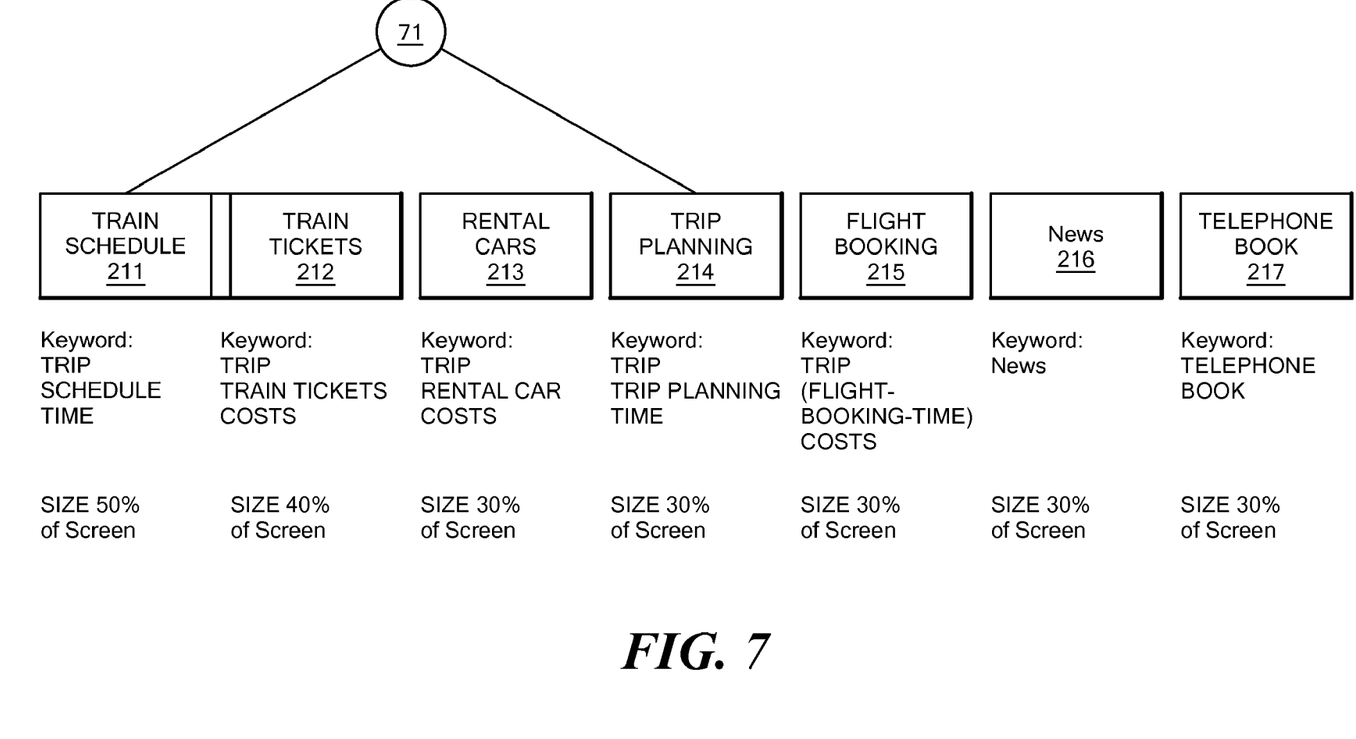
Figure 8:
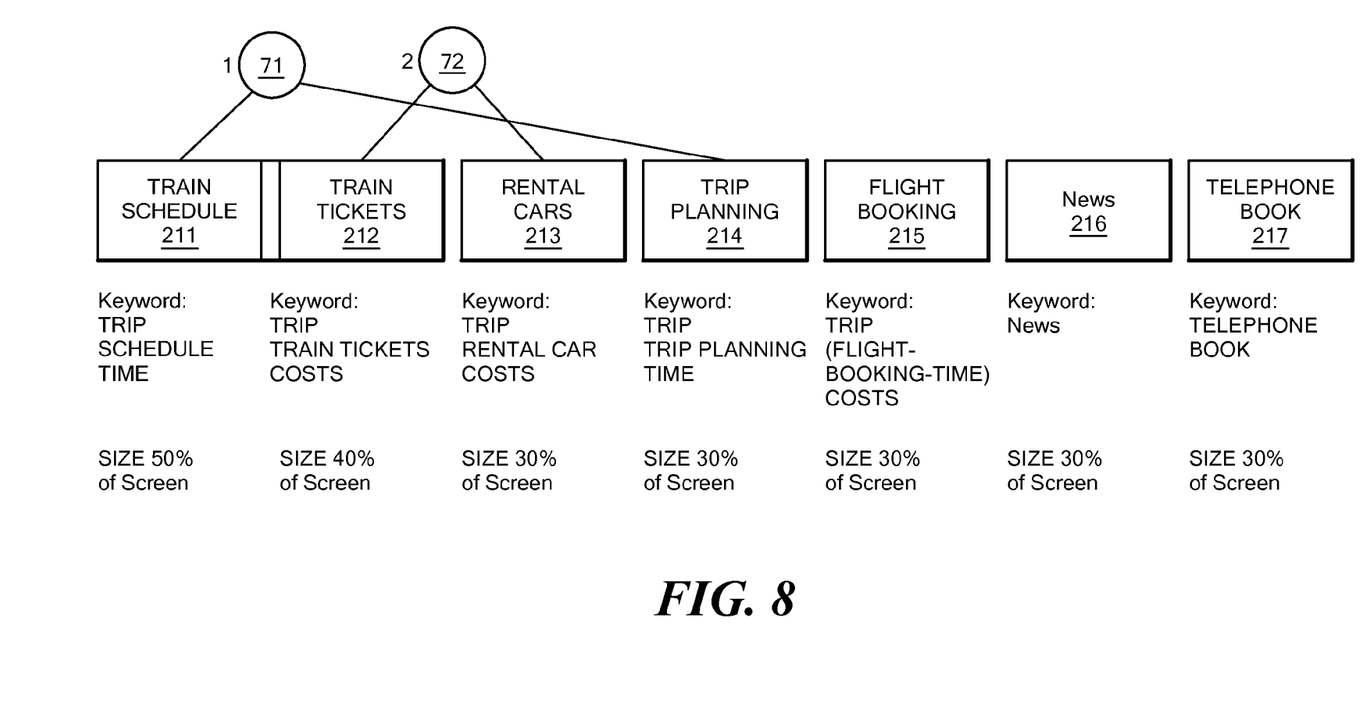

The hierarchical disclosed clustering algorithm will start with the cluster structure given in FIG. 6. In FIG. 6 a number of 7 start clusters exist, they are identical with the portals 211 to 217 from FIG. 2. Reference is thus made back to FIG. 2. The keywords given in FIG. 6 for each portal 211 to 217 are extracted from the above-mentioned data mining data sources, in this example the portlet description, the interaction interface description of the portlets and the mark-up of the portlets. Further, an additional indication of the portlet size expressed in terms of a fraction of the page is made for each portlet. For example the train schedule portlet 211 has a size of 50% of the screen.

For each iteration the sequence of steps 422 to 428—see FIG. 4—is run through. Step 422 in the starting run or first iteration yields a cluster structure as given in FIG. 6: each portlet is associated with a single cluster, i.e. the numbers of clusters and the number of portlets are identical. Then in step 424 the closest clusters are found and merged. This step is performed by aid of the distance calculation as it was given above. This yields a cluster structure as given in FIG. 7. Here, the portlets 211 and 214 are merged as their distance is 1 as calculated above, because they have two common keywords, namely "trip" and "time".

Then, step 426 is performed, wherein the distances between each cluster and the merged cluster is computed. Then in step 428 it is checked if any similar clusters are present. Here, the cluster-cluster distance calculation is performed as given above. A respective decision in step 428 yields that similar clusters exist. Thus, it is branched back in the YES-branch to step 424 for entering iteration number 2. Iteration 2 finds out that the train tickets cluster 212 and the rental cars cluster 213 are similar and are just joined i.e., merged. Then the next iteration is entered according to the algorithm given in FIG. 4.

Figure 9:
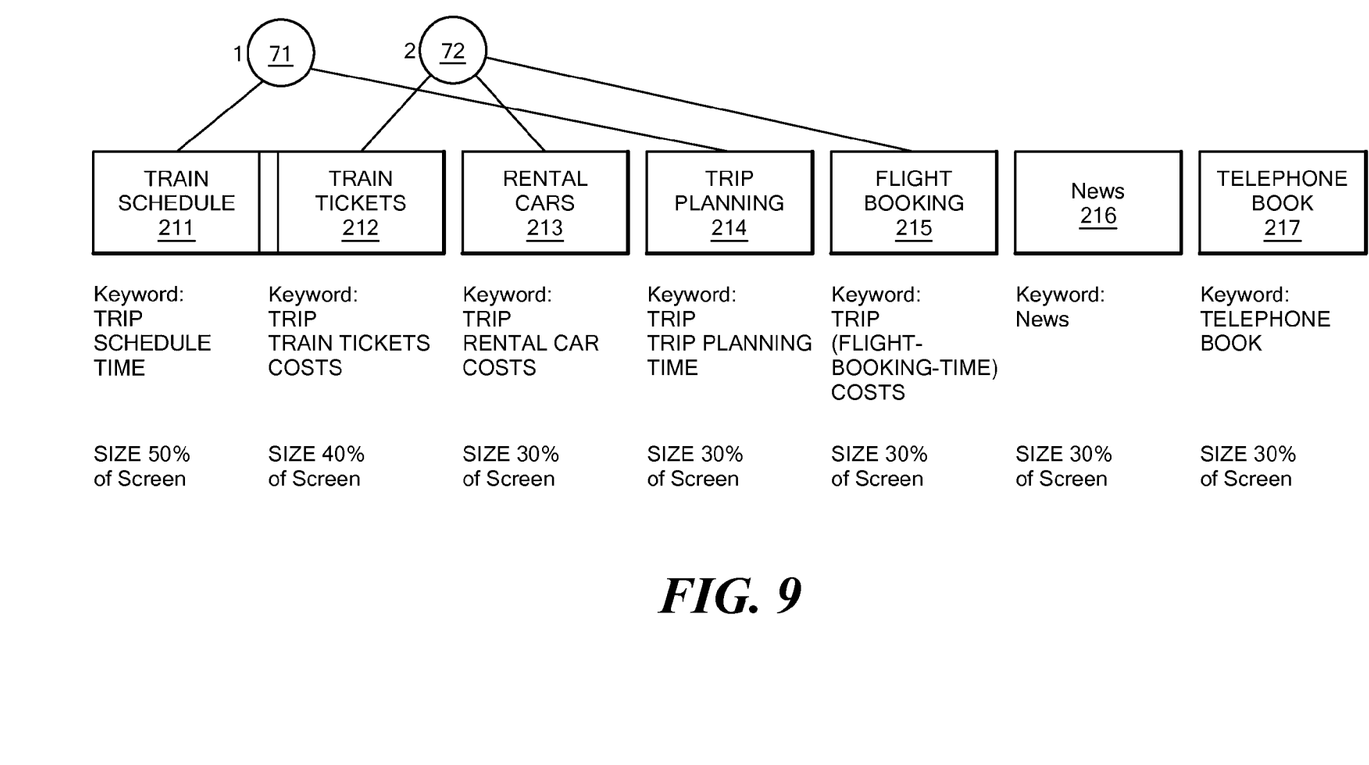

For iteration 3, FIG. 9 is relevant: the disclosed program component calculates the distances between cluster 71 and portlet 215 "flight booking" which reveals:

$D$(cluster 71,flight booking)=1+increment=1+6=7.

This calculation is done under the assumption that a size restriction involves the increment in order to avoid that more than 100% of the screen must be used for displaying a complete page. This is true in here because the portlet 211 and 214 require 80% of the page, which is too much to integrate additionally the flight booking portlet 215, which has in turn a size of 30% of the screen. Thus, a total size of 110% of the page would result, which leads the increment to be added in the above distance calculation. This size restriction increases the effective distance between portlet 215 and cluster 71.

Next, the distance between cluster 72 and portlet 215 is calculated to be 1, i.e., D (cluster 72, portlet 215)=1. Further, the other distances are also calculated: D (portlet 215, portlet 21)=5;
D (portlet 215, portlet 217)=5. As the portlet 215 is merged with the cluster to which it has the closest distance, portlet 215 will be merged with cluster 72.

Figure 10:
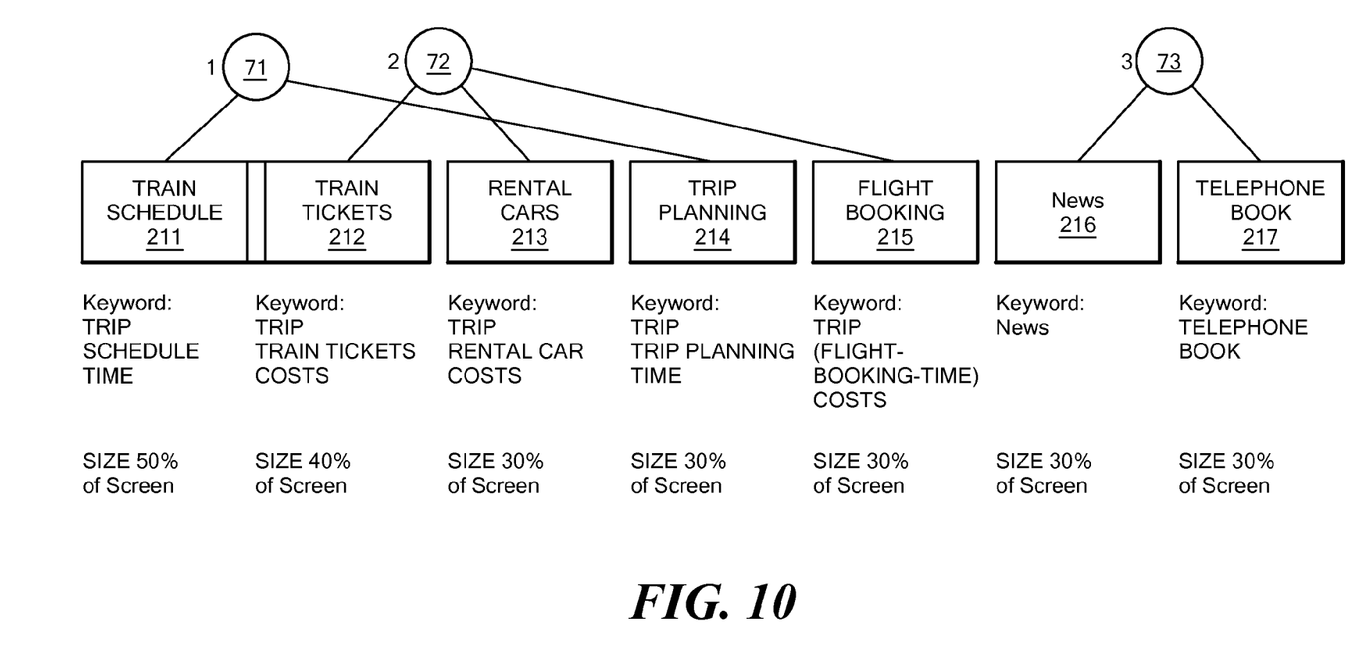

FIG. 10 shows the next cluster structure as reveals from iteration 4. In this iteration portlets 216 and 217 are merged in order to yield cluster 73. It should be noted that these are portlets having no common keyword.

Figure 11:
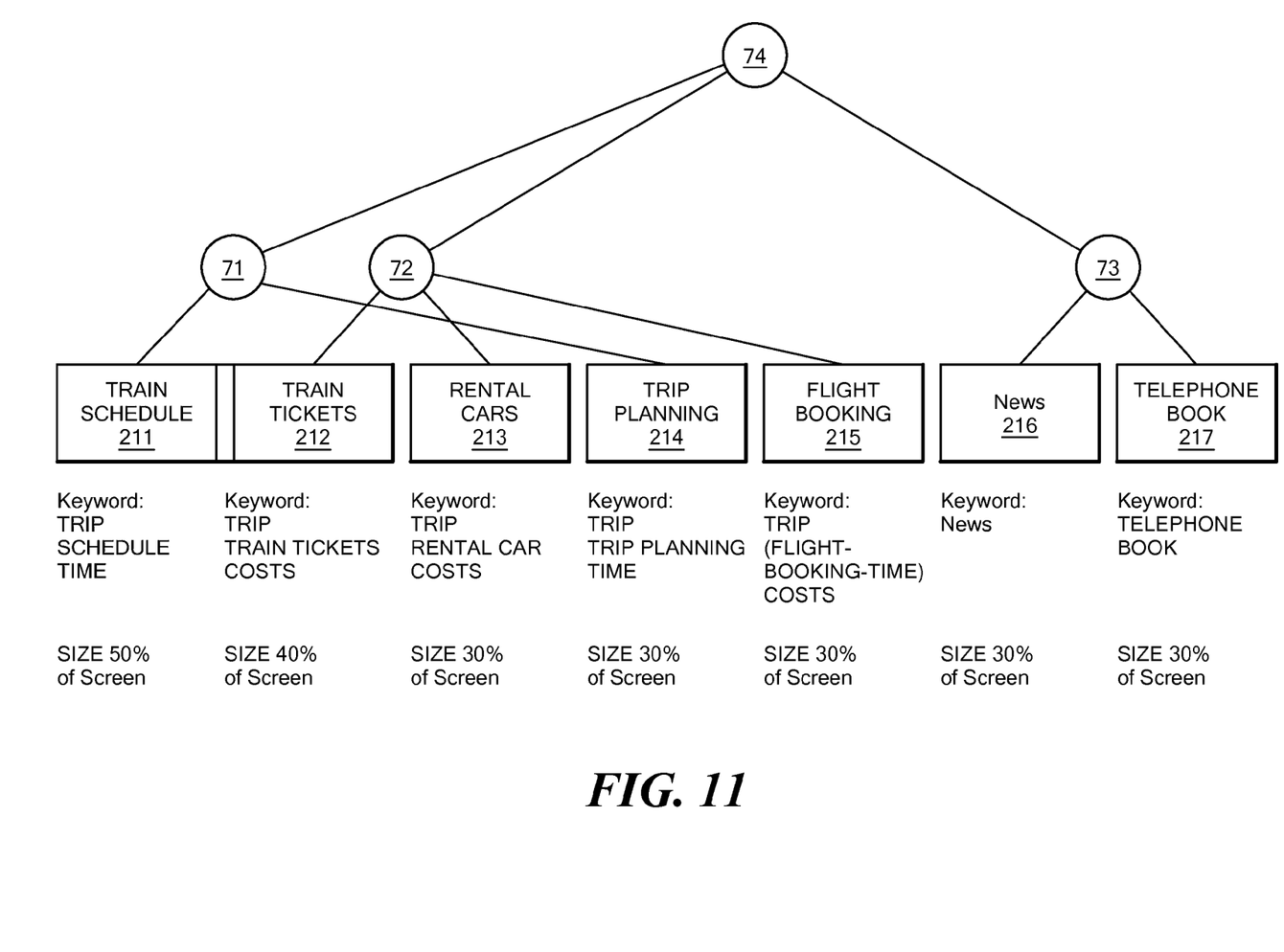

At this point, no more clusters can be merged, mainly because each merge operation would generate an overfull page (consuming more than 100% of the screen). However, one may consider the newly created clusters as automatically generated new portlets, each one containing the set of links to the cluster members, and each one inheriting the keywords from its cluster members. And now a program component can re-run the algorithm again, this time on the generated clusters. This time, however, the procedure would have finished after one step, gaining the two level structure as shown in FIG. 11: the new cluster 74 having the clusters 71, 72 and 73 as members.

The disclosed method can be varied broadly. For example, a Portlet interaction factor can be introduced, in order to reflect the inter-relations, and in particular the input/out dependence of certain portlets. For that embodiment the clustering algorithm is modified to recognize the fact that certain portlets are able to interact. This is done by analysis of the portlet interaction interface description (WSDL documents) and that of the portlet markup. From this pre-analysis, one or more sets of interacting Portlets are extracted from the total pool of Portlets. Different sets generally will not share a common Portlet. When interaction is determined then this fact is input as a (interaction) parameter into the calculation when computing distance values for these portlets. This is accomplished by an algorithm that computes an "interaction factor" for two portlets. This algorithm starts with a neutral value and increments an interaction factor (IFAC) between Portlet x and Portlet y, if portlet x can handle properties published by portlet y. This means the algorithm performs a matching of interaction between the interface description of portlet x and the markup of portlet y that contains JSP tags referring to interaction operations:

The algorithm can be based on the following sequence of steps:

$IFAC=1$ $X\text{in}=\{x|\text{property } x \text{ is referred as input property in interaction interface description of portlet } X\}$ $X\text{out}=\{x|\text{property } x \text{ is referred as output property in interaction interface description of portlet } X\}$ $Y\text{in}=\{y|\text{property } y \text{ is referred as input property in interaction interface description or markup of portlet } Y\}$ $Y\text{out}=\{y|\text{property } y \text{ is referred as output property in interaction interface description or markup of portlet } Y\}$ $\text{iff} 0<>\{X\text{in} \cap Y\text{out}\} \text{ then } IFAC=IFAC+\text{increment}$ $\text{iff} 0<>\{X\text{out} \cap Y\text{in}\} \text{ then } IFAC=IFAC+\text{increment}$ For example, two portlets A and B, increment=2:
A and B don't interact: This results in IFAC=1
A receives properties from B: This results in IFAC=3.
B receives properties from A: This results in IFAC=3.
A receives from B, B receives from A: This results in $IFAC=1+2+2=5$ The distance value reciprocally depends on the interaction factor.

In a further embodiment, the new content structure is stored separately in the Portal database 128 (FIG. 1), i.e. the current content structure is not modified. The Aggregation component 115 is modified to perform a check when a portal user logs on to the Portal or when a user requests a page. The check tests whether the new content structure of the requested page is modified in comparison to the current content structure. If this test yields "modified", the aggregation component 115 computes the difference between the current content structure and the new content structure, prepares actions to selectively adapt the current content structure according to the changes and inserts links for invoking the actions into the page markup. Thus the user is presented a link, through which he can enhance the page structure, for example add semantically or functionally related portlets to the page. The current content structure is changed when the user invokes the according link. In this embodiment the user fully controls any changes to the content structure.

This can be implemented for example as follows:

During processing of a request issued by a client, the first step is to get a page identification of the page requested by the client. The page is processed using prior art techniques.

Then the disclosed program component 180 retrieves the current content structure of the page using prior art techniques.

Then it retrieves the new content structure from the Portal database.

Then it compares the current content structure and the new content structure.

For all portlets that are contained in the new content structure only, the following procedure is run through:
first, the disclosed program component creates an URL that includes identifications of the current page, the new portlet and the type of action, i.e. "add portlet". Note that URL creation is performed through prior art techniques.

For all portlets that are contained in the current content structure only, the following procedure is run:
first, a URL is created that includes identifications of the current page, the according portlet and the type of action, i.e. "remove portlet". Also here, the URL creation is performed through prior art techniques.

Then it includes URLs in markup returned to client.

The client may issue the above-mentioned URLs to the Portal. The Portal will use prior art techniques to process the action contained in the URL, i.e. to add the specified portlet or to remove the portlet.

The skilled reader will appreciate that the before-mentioned embodiments showing certain procedures and proposed sequences of steps are primarily given for demonstrating the disclosed method by way of example. Thus, it will be understood that those examples may be varied in various aspects like for example the ordering of steps, the degree of parallelization between steps, the implementation details of the single steps, the form in which data is stored, the way how the grouping of portlets is achieved, etc., and respective further embodiments can be obtained.

The present invention can be realized in hardware, software, or a combination of hardware and software. A Portlet arrangement tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for arranging portlets in a Web Portal based on a hierarchical content structure of portal pages and portlets, comprising:
   retrieving data mining input data relating to said portlets;
   performing a data mining function on said data mining input data, resulting in a data mining result revealing respective similarities between said portlets, wherein the mining comprises expressing said revealed respective similarities between said portlets as distances between said portlets, clustering said portlets based on said distances into a plurality of resulting clusters such that related ones of said portlets are clustered together, and aggregating distance values of pairs of portlets in different clusters to define at least one inter-cluster distance;
   calculating a new hierarchical content structure from said data mining result, wherein said new hierarchical content structure arranges semantically and functionally similar portlets near by each other, wherein said new hierarchical content structure describes a hierarchy of Web pages within said Web portal and portlets contained within said Web pages; and
   offering new Web pages for said Web Portal based on said new hierarchical content structure such that ones of said portlets within the same one of said plurality of resulting clusters are contained within the same one of said new Web pages, wherein the offered new Web pages for said Web Portal meet predetermined Web page layout requirements including predetermined distance threshold values for portlets represented on a single Web page.

2. The method of claim 1, wherein said retrieving data mining input relating to said portlets is from a portlet markup.

3. The method of claim 1, wherein said retrieving data mining input relating to said portlets is from a portlet description.

4. The method of claim 1, wherein said retrieving data mining input relating to said portlets is from a portlet interaction description of portlets residing on said portal.

5. The method of claim 1, wherein said revealed similarities between said portlets are semantic similarities.

6. The method of claim 1, wherein said revealed similarities between said portlets are respective functional similarities.

7. The method according to claim 1, further comprising the step of receiving an administrator feedback, said administrator feedback indicating whether the offered new Web pages for said Web Portal are accepted as a base version for a new Web Portal version.

8. The method according to claim 1, further comprising receiving an administrator feedback including manually performed corrections on said offered new Web pages for said Web Portal.

9. The method according to claim 1, wherein the step of calculating said new hierarchical content structure is based on iterations and starts with an existing portlet arrangement.

10. The method according to claim 1, wherein the step of calculating said new hierarchical content structure is performed when a new portlet is to be installed on a page.

11. The method according to claim 1, further comprising the steps of:
   storing said new hierarchical content structure separately from an existing hierarchical content structure;
   in response to a predetermined user action, determining modifications of the existing hierarchical content structure having led to the new hierarchical content structure; and
   offering a user input control for selectively adapting the existing hierarchical content structure according to said modifications.

12. The method of claim 1, further comprising:
   wherein the mining comprises performing a clustering of related portlets A, B into clusters X, Y, where portlet A is in cluster X and portlet B is in cluster Y.

13. The method of claim 12, further comprising:
   computing an interaction factor (IFAC) between portlet A and portlet B based on the number of properties published by portlet B that portlet A can handle such that higher numbers of properties published by portlet B that portlet A can handle result in higher values for said interaction factor; and
   computing a distance between portlet A and portlet B in said content structure based on said interaction factor such that said distance between portlet A and portlet B in said content structure is less for higher values of said interaction factor.

14. The method according to claim 12, wherein an inter-cluster distance D between cluster X and cluster Y is defined by aggregating the distance values of pairs of portlets A, B in said cluster X and said cluster Y.

15. The method according to claim 14, wherein the offered new Web pages for said Web Portal depend on the size of the visual representation of the markup aggregated from the portlets contained in cluster X and cluster Y.

16. The method according to claim 14, wherein the inter-cluster distance D is calculated by computing the maximum of distances between all existing pairs of portlets residing in two different clusters, according to:

$D=\max\{d(A,B)$ where portlet $A$ is in cluster $X$ and portlet $B$ is in cluster $Y\}$, and $d$ is the distance between portlets.

17. The method according to claim 14, wherein the inter-cluster distance D is calculated by computing the average of distances between all existing pairs of portlets residing in two different clusters, according to:

$D=\mathrm{avg}\ \{d(A,B)$ where portlet $A$ is in cluster $X$ and portlet $B$ is in cluster $Y\ \}$, and $d$ is the distance between portlets.

18. A system including at least one processor and a non-transitory computer readable storage medium, said computer readable storage medium having program code stored thereon for, when executed on said processor, arranging portlets in a Web Portal based on a hierarchical content structure of portal pages and portlets, said program code comprising:
   program code for retrieving data mining input data relating to said portlets;
   program code for performing a data mining function on said data mining input data, resulting in a data mining result revealing respective similarities between said portlets, wherein the mining comprises expressing said revealed respective similarities between said portlets as distances between said portlets, clustering said portlets based on said distances into a plurality of resulting clusters such that related ones of said portlets are clustered together, and aggregating distance values of pairs of portlets in different clusters to define at least one inter-cluster distance;
   program code for calculating a new hierarchical content structure from said data mining result, wherein said new hierarchical content structure arranges semantically and functionally similar portlets near by each other, wherein said new hierarchical content structure describes a hierarchy of Web pages within said Web portal and portlets contained within said Web pages; and
   program code for offering new Web pages for said Web Portal based on said new hierarchical content structure such that ones of said portlets within the same one of said plurality of resulting clusters are contained within the same one of said new Web pages, wherein the offered new Web pages for said Web Portal meet predetermined Web page layout requirements including predetermined distance threshold values for portlets represented on a single Web page.

19. A computer program product including a non-transitory computer readable storage medium, said computer readable storage medium having program code stored thereon for arranging portlets in a Web Portal based on a hierarchical content structure of portal pages and portlets, said program code comprising:
   program code for retrieving data mining input data relating to said portlets;
   program code for performing a data mining function on said data mining input data, resulting in a data mining result revealing respective similarities between said portlets, wherein the mining comprises expressing said revealed respective similarities between said portlets as distances between said portlets, clustering said portlets based on said distances into a plurality of resulting clusters such that related ones of said portlets are clustered together, and aggregating distance values of pairs of portlets in different clusters to define at least one inter-cluster distance;
   program code for calculating a new hierarchical content structure from said data mining result, wherein said new hierarchical content structure arranges semantically and functionally similar portlets near by each other, wherein said new hierarchical content structure describes a hierarchy of Web pages within said Web portal and portlets contained within said Web pages; and
   program code for offering new Web pages for said Web Portal based on said new hierarchical content structure such that ones of said portlets within the same one of said plurality of resulting clusters are contained within the same one of said new Web pages, wherein the offered new Web pages for said Web Portal meet predetermined Web page layout requirements including predetermined distance threshold values for portlets represented on a single Web page.

\* \* \* \* \*